United States Patent [19]

Oishi et al.

[11] 4,172,869
[45] Oct. 30, 1979

[54] METHOD OF AND APPARATUS FOR MANUFACTURING FIBER-REINFORCED THERMOPLASTIC RESIN OF CELLULAR STRUCTURE

[75] Inventors: Yoshisue Oishi, Osaka; Akihisa Inoue, Hirakata; Syuji Moriya, Neyagawa; Hironori Nakabayashi, Hagashi Osaka; Yasuaki Kobayashi, Neyagawa; Hiroyuki Nagata, Kashiwara, all of Japan

[73] Assignee: Kurashiki Boseki Kabushiki Kaisha, Kirashiki, Japan

[21] Appl. No.: 889,448

[22] Filed: Mar. 23, 1978

[30] Foreign Application Priority Data

Apr. 11, 1977 [JP] Japan .................... 52/41638
Apr. 11, 1977 [JP] Japan .................... 52/41639

[51] Int. Cl.² ............................................. B29D 27/00
[52] U.S. Cl. .................... 264/46.3; 264/46.7; 264/134; 264/257; 425/115; 425/371; 425/817 C; 427/434 B; 428/114; 428/294; 428/317
[58] Field of Search .............. 264/45.3, 174, 46.3, 264/109, 26, 46.5, 134, 257, 46.7; 15/159 A; 427/434 B; 425/115, 371; 428/114, 294, 317

[56] References Cited

U.S. PATENT DOCUMENTS

| | | | |
|---|---|---|---|
| 2,865,790 | 12/1958 | Baer | 264/26 X |
| 2,972,554 | 2/1961 | Muskat et al. | 264/45.3 X |
| 3,238,281 | 3/1966 | Kato | 15/159 A X |
| 3,448,489 | 6/1969 | Boggs | 264/174 X |
| 3,551,280 | 12/1970 | Kippan | 264/45.3 X |
| 3,917,774 | 11/1975 | Sagane | 264/45.3 X |
| 3,951,718 | 4/1976 | Gonzalez | 264/45.3 X |
| 3,980,511 | 9/1976 | Proucelle | 264/45.3 X |
| 4,025,256 | 5/1977 | Heller | 264/46.3 X |

FOREIGN PATENT DOCUMENTS

49-13218 3/1974 Japan.
51-101073 3/1975 Japan.
52-25864 8/1975 Japan.
52-60867 5/1977 Japan.

*Primary Examiner*—Philip Anderson
*Attorney, Agent, or Firm*—Wenderoth, Lind & Ponack

[57] ABSTRACT

The manufacture is carried out by impregnating bundles of filaments of fibrous-reinforcing material in a bath made up of an emulsion of a thermoplastic resin and a blowing agent. The emulsion-impregnated reinforcing filament bundles are then squeezed and dried to form resin coatings, and then collected to provide a single bunch of the fiber-reinforced thermoplastic resin material. This bunch is subsequently heated and allowed to expand in a tunnel and also cooled in a tunnel to produce a fiber-reinforced thermoplastic resin of a cellular structure. During the impregnation with the emulsion in a bath, the bundles are slackened and repeatedly beaten in the condition of free tension to cause the filament bundles to be substantially frayed to facilitate the impregnation. An apparatus utilizable in the practice of the above method is also disclosed.

6 Claims, 14 Drawing Figures

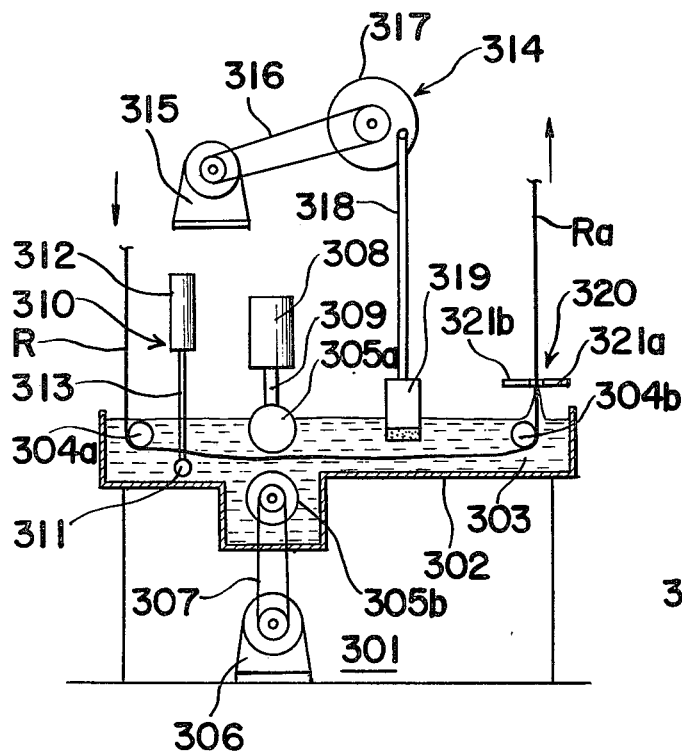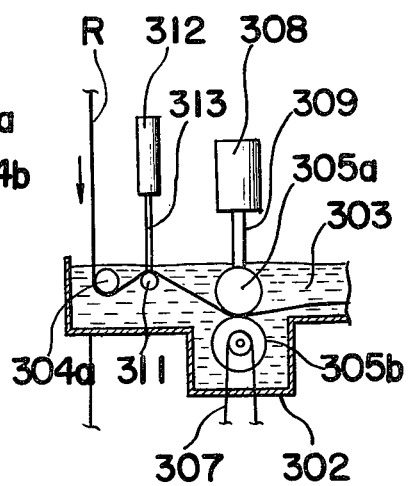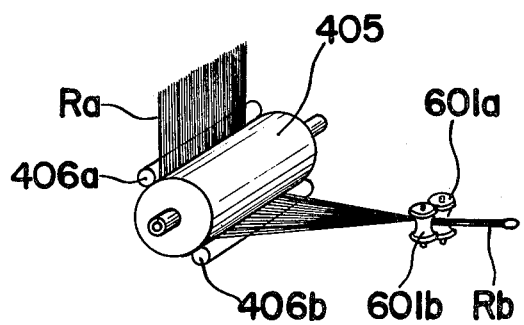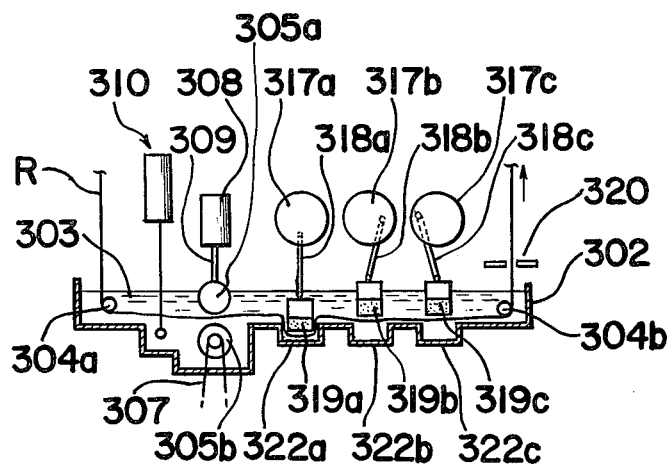

METHOD OF AND APPARATUS FOR MANUFACTURING FIBER-REINFORCED THERMOPLASTIC RESIN OF CELLULAR STRUCTURE

BACKGROUND OF THE INVENTION

The present invention relates to a method of and an apparatus for manufacturing a fiber-reinforced thermoplastic resin of cellular structure. More particularly, the present invention relates to a method of and an apparatus for continuously manufacturing a light-weight, high strength construction material made of fiber-reinforced thermoplastic resin of cellular structure and having a specific gravity within the range of 0.2 to 1.0 and other physical properties comparable with those of a natural wood of a kind generally employed as a construction material.

The Japanese Patent Publication No. 48-8468, first published for opposition on Mar. 14, 1973, discloses a fiber-reinforced thermoplastic plate manufactured by applying a thermoplastic resin powder to glass fibers, while the latter are heated to a temperature higher than the softening point of the thermoplastic resin powder, so as to form resin-impregnated glass fibers and then applying a pressure to a mass of the resin-impregnated glass fibers, while the latter are heated to a temperature higher than the fluidizing temperature at which the thermoplastic resin starts its fluidization, to thereby provide the fiber-reinforced thermoplastic plate.

The Japanese Patent Laid-open Publication No. 48-40864, laid open to public inspection on June 15, 1973, discloses a fiber-reinforced thermosetting resin of cellular structure manufactured by applying a solution of expandable thermosetting resin to a plurality of glass fiber rovings, collecting the resin-impregnated rovings to provide a substantially square-sectioned bundle of the rovings by the use of a bundling mold, applying a pressure to the bundle of the rovings during the passage thereof through the bundling mold to allow the thermosetting resin to be expanded and subsequently cured, and drawing the resultant fiber-reinforced thermosetting resin of cellular structure out of the bundling mold.

In the method of the Japanese Patent Laid-open Publication No. 48-40864, the thermosetting resin is an unsaturated polyester or urethane resin and, since this thermosetting resin even though applied in the liquid form tends to be readily expanded and cured in a relatively short period of time, for example, within 1 to 2 minutes, the thermosetting resin solution does not sufficiently penetrate into interstices of glass fibers making up the individual rovings. The consequence is that the resultant product is not sufficiently reinforced even though mixed with glass fibers.

The Japanese Patent Publication No. 49-31741, first published for opposition on Aug. 24, 1974, discloses a fiber-reinforced thermoplastic resin manufactured by immersing a fiber glass mat in a bath containing an emulsion of thermoplastic resin and then drying the emulsion-impregnated glass mat under heated condition, for example, at 130° C., for a predetermined period of time, for example, 10 minutes. The fiber-reinforced thermoplastic resin according to this Japanese Patent Publication No. 49-31741 has failed to have a cellular structure and, therefore, cannot be used in such an application in which a wooden construction material is employed.

On the other hand, it is generally recognized that the thermoplastic resin, even when reinforced by glass fibers, cannot be improved so much as the thermosetting resin reinforced by glass fibers because most physical properties of the former are inferior to those of the latter. Moreover, although a method for impregnating glass fibers with an emulsion of thermoplastic resin is well known, no method has been found to manufacture a light-weight construction material, similar to the natural wood, by the use of a blowing agent in the emulsion and this fact illustrates that the mere employment of the thermoplastic resin emulsion does not result in expansion of the thermoplastic resin.

SUMMARY OF THE INVENTION

Accordingly, the present invention has for its essential object to provide a method of and an apparatus for continuously manufacturing a fiber-reinforced thermoplastic resin of cellular structure which is substantially free from such drawbacks as inherent in a similar product manufactured by the prior art methods referred to above.

Another object of the present invention is to provide the method of and the apparatus of the type referred to above capable of producing the fiber-reinforced thermoplastic resin of cellular structure which can satisfactorily and effectively be used as a light-weight, high strength construction material in substitution for a natural wood due to its physical properties comparable with those of the natural wood.

According to the present invention, the fiber-reinforced thermoplastic resin of cellular structure, which is hereinafter referred to as a "cellular FRTP product" for the sake of brevity, can be manufactured by impregnating a plurality of bundles of filaments of fibrous reinforcing material (each of said bundles of filaments of fibrous reinforcing material being hereinafter referred to as "reinforcing filament bundles") in a bath containing an emulsion of thermoplastic resin and a blowing agent wherein said bundles are transported therethrough while said bundles are slackened and concurrently repeatedly beaten in the condition of free tension, then squeezing out excess emulsion and drying the emulsion-impregnated reinforcing filament bundles by the application of heat of elevated temperature, collecting the dried filament bundles together to provide a single bunch of the fiber-reinforced thermoplastic resin material preheating the dried reinforcing filament bundles in readiness for the subsequent processing step, compressing the preheated reinforcing filament bundles, before said dried reinforcing filament bundles cool down to a temperature far below the temperature at which they have been dried, to provide an integrally bonded block of fiber-reinforced thermoplastic resin material allowing the block of fiber-reinforced thermoplastic resin material to expand, and finally cooling the expanded block of fiber-reinforced thermoplastic resin material to provide the cellular FRTP product.

The emulsion-impregnated reinforcing filament bundles may be collected together to provide a single bunch of reinforcing filament bundles prior to or subsequent to the drying step. Alternatively, subsequent to the drying step, the emulsion-impregnated reinforcing filament bundles may be collected together to provide a single bunch of reinforcing filament bundles bonded together.

One of various features of the present invention resides in the employment of the emulsion of thermoplastic resin which can readily and effectively penetrate into interstices of the fibrous reinforcing filaments making up each bundle. In general, it is well recognized that the thermoplastic resin, even when reinforced by glass fibers, cannot be improved so much as the thermosetting resin reinforced by glass fibers because most physical properties of the former are inferior to those of the latter. In spite of this general notion, the method of manufacturing the cellular FRTP product according to the present invention is effective to make the best use of the thermoplastic resin, in the form of an emulsion, to provide the cellular FRTP product which is light in weight and high in physical strength and has a specific gravity within the range of 0.4 to 0.6 and improved resistances to impact, thermal deformation and corrosion.

Another feature of the present invention resides in the employment of the blowing agent added to the emulsion of the thermoplastic resin. The employment of the blowing agent advantageously participates in formation of the cellular structure in the resultant FRTP product and consequent reduction in weight of the cellular FRTP product.

A further feature of the present invention resides in the effectuation of the compression to provide an integrally bonded block of fiber-reinforced thermoplastic resin prior to the latter being expanded, the integrally bonded block so formed by the compression has no substantial interstices of the reinforcing fibers, but the thermoplastic resin sticking to the reinforcing filament bundles are integrated together. By the employment of the compression step, the cellular FRTP product having uniformly distributed filaments of fiber and fine cells can be ultimately obtained when the blowing agent is decomposed during the subsequent expansion process.

By way of example, according to the method of the present invention, the cellular FRTP product which is light in weight and which has a specific gravity of about 0.5 and a flexural strength of 700 to 800 kg/cm$^2$ can be manufactured if the amount of glass fibers employed as a reinforcing material in the cellular FRTP product is 30% by weight relative to the total weight of the cellular FRTP product so manufactured.

The cellular FRTP product manufactured by the method of the present invention can be used as a lightweight, high strength construction material and has a specific gravity within the range of 0.4 to 0.6 and other physical properties comparable with a similar construction material made of a natural wood. In addition to the light-weight and high strengh features, the cellular FRTP product according to the present invention has a high impact resistance, a high resistance to thermal deformation and a high resistance to corrosion. Therefore, the cellular FRTP product according to the present invention can also be used as a material for equipments, such as a liquid purifying tank and a liquid treating bath, to be used in chemical plants and a cushioning material for marine use.

According to the present invention, each of the filaments of reinforcing material may be either a synthetic resin fiber, such as polyester fiber, polyamide fiber or vinylon fiber, or a carbon fiber. The reinforcing filament bundles may have the shape of a roving, or a yarn.

The emulsion of thermoplastic resin added with the blowing agent must have a minimum film forming temperature of 50° to 200° C., preferably, 70° to 150° C. The principal constituent of the emulsion may be one or a mixture of polyvinyl chloride, polymethacrylic acid esters; polystyrene, acrylonitrile-styrene copolymers and acrylonitrile-butadiene-styrene copolymers.

The blowing agent added to the emulsion may be an organic decomposable blowing agent such as azodicarbonamide or 2,2'-azobisisobutyronitrile. This blowing agent may be added to the emulsion of thermoplastic resin in the form of a water dispersion or an emulsion.

The emulsion of the composition described above may contain some or all of plasticizer, fire retardant, lubricant, stabilizer, filler and coloring agent. These may, if employed, be added to the emulsion in the form of a water dispersion or an emulsion.

Preferably, the amount of reinforcing material, that is, the amount of the reinforcing filament bundles, contained in the ultimate cellular FRTP product manufactured according to the present invention be, in the case where such reinforcing material is constituted by glass fibers, within the range of 10 to 80%, preferably, 20 to 50%, by weight relative to the total weight of the cellular FRTP product. If the amount of the glass fibers contained in the resultant cellular FRTP product is not more than 10% by weight, the cellular FRTP product will lack a sufficient strength and, if it be not less than 80% by weight, the product will not be sufficiently expanded and, therefore, will fail to represent a satisfactory cellular structure.

In the practice of the present invention, the resin-impregnated reinforcing filament bundles may be collected together to provide a single bunch either prior to or subsequent to the drying of the resin-impregnated reinforcing filament bundles. In terms of the drying efficiency, it is preferred to collect the resin-impregnated reinforcing filament bundles together subsequent to the drying. If the bundles are collected together prior to the drying, it is possible to manufacture the cellular FRTP product having the reinforcing material uniformly distributed in it. However, since it will take a relatively long period of time in drying if the number of the reinforcing filament bundles is relatively great, the collecting process is preferred to be carried out subsequent to the drying process. In other words, whether the reinforcing filament bundles are to be collected together to provide the bunch immediately after the immersing step or whether they are to be collected together to provide the bunch immediately after the drying step may be determined in consideration of the readiness and easiness of drying of the reinforcing filament bundles impregnated with the emulsion of thermoplastic resin.

It is to be noted that the drying must be sufficiently performed, or otherwise the ultimate cellular FRTP product will contain undesirable voids.

Subsequent to the drying and prior to the compression, the dried reinforcing filament bundles may be preheated. However, where the reinforcing filament bundles which have been dried and, therefore, heated, can readily be transferred to the subsequent compression process without allowing the temperature of the dried reinforcing filament bundles to lower, the preheating process may be omitted.

According to the present invention, there is also provided an apparatus for continuously manufacturing the cellular FRTP product. The apparatus generally comprises a supply unit from which the reinforcing filament bundles are individually continuously supplied, an immersing unit including the emulsion bath provided with means for slackening and beating, a drying unit constituted by a drying furnace for drying the emulsion-impregnated reinforcing filament bundles during their passage therethrough, a collecting unit for collecting the dried reinforcing filament bundles together to provide the bunch, a heating unit including a heating tunnel for heating the bunch to a temperature higher than the temperature at which the blowing agent employed can be decomposed to allow the bunch of the fiber-reinforced thermoplastic resin material to expand during the passage thereof through the heating unit, and a cooling unit including a cooling tunnel for cooling the resultant product, that is, the cellular FRTP product.

The immersing unit further includes means for slackening substantial portions of the respective reinforcing filament bundles, which are immersed into the emulsion bath and are travelling in parallel relation to each other, and means for beating the individual reinforcing filament bundles in the condition of free tension to cause the slackened portions of the reinforcing filament bundles to be substantially frayed. With the immersing unit so constructed according to the present invention, the emulsion can effectively penetrate into interstices of reinforcing filaments of each of the reinforcing filament bundles.

As is well known to those skilled in the art, a single roving of glass fibers is composed of 10 to 20 thousand filaments of fiber glass and, therefore, mere immersion of such glass fiber roving into the emulsion bath will not result in the emulsion penetrating into interstices defined among such fiber glass filaments. However, with the immersing unit so constructed as hereinbefore described, this problem can satisfactorily and effectively be solved.

While the collecting unit concurrently serves to apply a pressure to a group of the emulsion-impregnated and subsequently dried reinforcing filament bundles in a direction substantially radially inwardly of the bunch of the fiber-reinforced thermoplastic resin material being formed, the apparatus according to the present invention may further comprise a compressing unit for compressing the bunch of the fiber-reinforced thermoplastic resin material to cause the respective bundles to be integrated together. The employment of the compressing unit is advantageous in that production of the cellular FRTP product having uniformly distributed filaments of fibers and fine cells can be facilitated.

BRIEF DESCRIPTION OF THE DRAWING

In any event, these and other objects and features of the present invention will become apparent from the following description taken in conjunction with preferred embodiments thereof with reference to the accompanying drawings, in which:

FIG. 2 is a schematic side sectional view, on an enlarged scale, of a portion of the apparatus of FIG. 1, showing the details of an immersing unit in one operative position;

FIG. 3 is a schematic side sectional view of a portion of the immersing unit of FIG. 2 in another operative position;

FIG. 4 is a schematic perspective view of a collecting unit employed in the apparatus of FIG. 1;

FIG. 5 is a view substantially similar to FIG. 2, showing a modified form of the immersing unit;

DETAILED DESCRIPTION OF THE INVENTION

Figure 1:
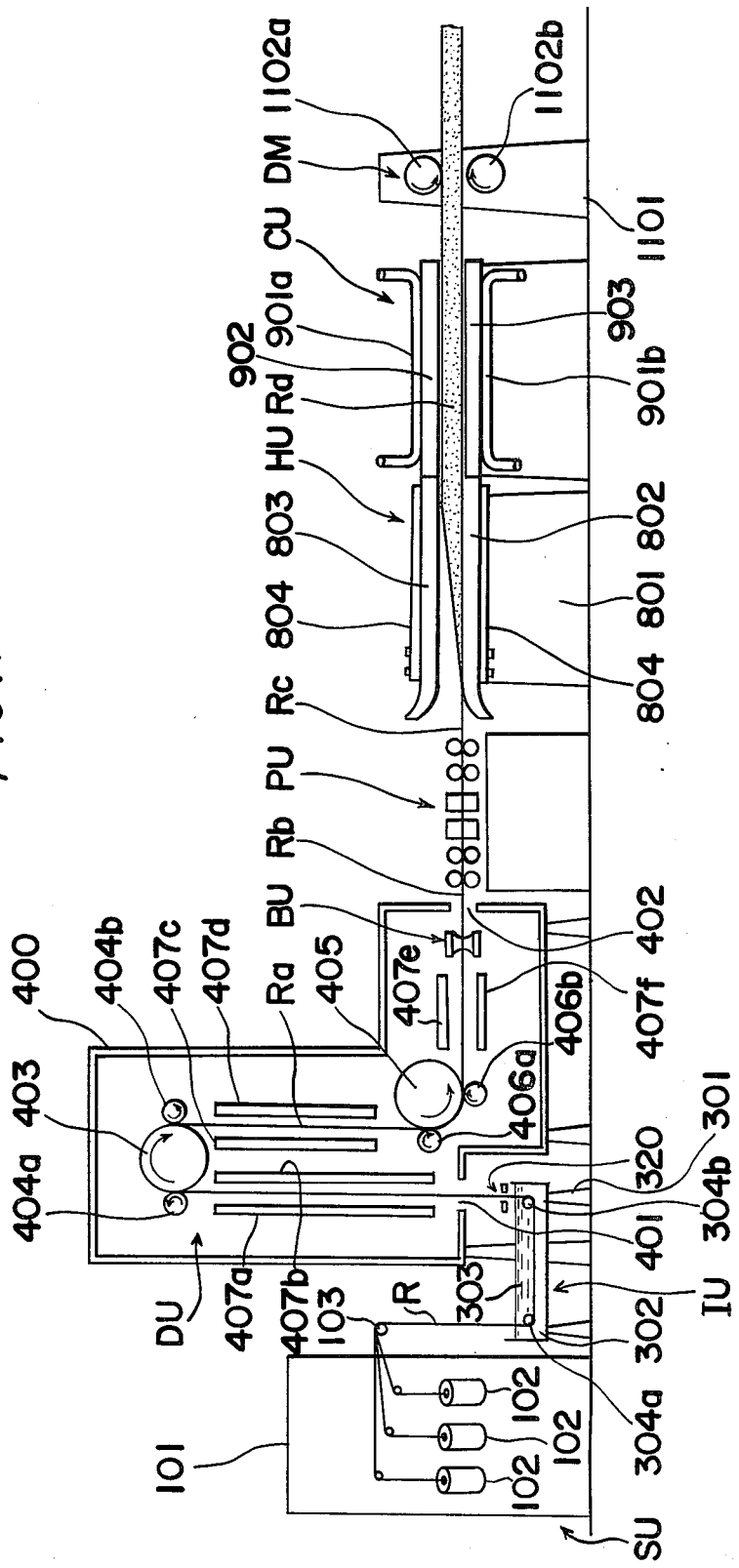
FIG. 1 is a schematic side sectional view of an apparatus according to the present invention.

Before the description of the present invention proceeds, it is to be noted that like parts are designated by like reference numerals throughout the accompanying drawings. It is also to be noted that, for the sake of brevity, the present inventon will be described wherein each of the reinforcing filament bundles is employed in the form of a glass fiber roving.

Referring first to FIG. 1 and as hereinbefore described, the apparatus according to the present invention generally comprises a supply unit SU from which glass fiber rovings are individually supplied; an immersing unit IU where the rovings are immersed into the emulsion of thermoplastic resin added with the blowing agent while they are simultaneously frayed; a drying unit DU for drying the emulsion-impregnated rovings; a collecting unit BU for collecting the dried rovings together to provide the bunch; a compressing unit PU for integrating the rovings, forming the bunch, to provide a continuously elongated body of glass fiber reinforced thermoplastic resin material; a heating unit HU for heating the elongated body of fiber-reinforced thermoplastic resin material to allow the latter to expand; a cooling unit CU for cooling the resultant product, that is, the cellular FRTP product in the form of a rod; and a drawing mechanism DM for drawing the rod of fiber-reinforced thermoplastic resin of cellular structure out of the machine.

These components of the apparatus of the present invention will be hereinafter described individually under respective headings for the purpose of facilitating a ready and better understanding of the present invention.

Supply Unit SU

Referring to FIG. 1, the supply unit SU comprises a creel 101 of any known construction having a plurality of, for example, one hundred, bobbins 102 each having a glass fiber roving R wound thereon. The rovings R are pulled outwards from the respective bobbins 102 under the influence of a traction force which is developed in the subsequent processing machine units and, therefore, acts on the rovings R to pull the latter towards the drawing mechanism DM and then out of the machine. The rovings R so pulled outwards from the respective bobbins 102 are turned towards the immersing unit IU around a turn-roll 103 having its longitudinal axis extending perpendicular to the direction of advance of the individual rovings R.

It should be noted that the supply unit SU including the turn-roll 103 is so designed that, at the time the rovings R are turned around the turn-roll 103 towards the immersing unit IU, the rovings from the respective bobbins 102 can be already arranged in such a manner as to extend in parallel relation to each other widthwise of the turnroll 103, such as readily understood substantially from the left-hand portion of FIG. 1.

Immersing Unit IU

Referring to FIG. 2, the immersing unit IU comprises a bath 302 mounted on any known suitable support structure 301 and containing therein an emulsion 303 of thermoplastic resin added with a blowing agent. The rovings R supplied from the supply unit SU via the turn-roll 103 are, while they are continuously moved in one direction under the influence of the traction force towards any one of the subsequent processing machine units, immersed into the emulsion 303 within the bath 302 and, at the same time, alternately slackened and repeatedly beaten within the bath 302. The details of the immersing unit IU are best shown in FIGS. 2 and 3, reference to which will now be made.

As best shown in FIG. 2, the emulsion bath 302 has a pair of spaced guide rolls 304a and 304b submerged into the emulsion 303 within the bath 302 and rotatably supported in any suitable manner respectively adjacent trailing and leading ends of the emulsion bath 302 in terms of the direction of movement of the rovings. These guide rolls 304a and 304b extend in parallel relation to each other and perpendicular to the direction of movement of the rovings. So far illustrated, the rovings R downwardly extending from the turn-roll 103 towards the bath 302 enter the emulsion 303 within the bath 302, then extend adjacent the bottom of the bath 302 towards the guide roll 304b after having been turned around the guide roll 304a, and finally emerge upwardly out of the emulsion 303 after having been turned around the guide roll 304b.

The immersing unit IU includes means for slackening the respective rovings which extend between the guide rolls 304a and 304b and means for bearing the individual rovings to cause the slackened portions of the rovings to be substantially frayed. The slackening means is substantially composed of a pair of juxtaposed nipping rolls 305a and 305b positioned one above the other with the rovings extending between them, and a tensioning device 310. One of the nipping rolls, such as designated by 305a, is so rotatably carried by a cylinder rod 309, adapted to be reciprocally driven by a pneumatic cylinder 308, as to be movable between nipping and releasing positions in a direction close to and away from the other nipping roll 305b, respectively. The nipping roll 305b is motor-driven and, for this purpose, the roll 305b is coupled to a motor 306 by means of a substantially endless transmission member 307, such as a belt or a chain. It is to be noted that the nipping roll 305b is rotated by the motor 306 at a peripheral velocity equal to or slightly higher than the velocity of movement of the rovings which is effected under the influence of the traction force developed in the subsequent processing machine units. The nipping rolls 305a and 305b cooperate to each other in such a manner that, when the nipping roll 305a is moved to the nipping position as shown in FIG. 3 by the pneumatic cylinder 308, the rovings immersed in the emulsion 303 within the bath 302 can be nipped between the rolls 305a and 305b and, when the roll 305a is moved to the releasing position as shown in FIG. 2, the rovings are free to pass through a gap between the rolls 305a and 305b.

The tensioning device 310, cooperative with the nipping rolls 305a and 305b, is positioned between the guide roll 304a and the nipping roll assembly and is constituted by a pull bar 311 extending beneath the rovings and above the bottom of the bath 302 in parallel relation to the guide roll 304a and operatively coupled to a pneumatic cylinder 312 having a cylinder rod 313 by which said pull bar 311 is rotatably carried. By the operation of the pneumatic cylinder 312 associated with the pneumatic cylinder 308 as will be described later, the pull bar 311 can be selectively moved between an upwardly shifted position, as shown in FIG. 3, and a downwardly shifted position as shown in FIG. 2.

The pneumatic cylinder 308 and 312 are operatively associated in such a manner that, when the nipping roll 305a is moved to the nipping position as shown in FIG. 3, the pull bar 311 can be shifted to the upwardly shifted position to forcibly draw the rovings R from the associated bobbins 102 and, when the nipping roll 305a is returned to the releasing position as shown in FIG. 2, the pull bar 311 can be shifted to the downwardly shifted position to allow the portions of the respective rovings, which extend between the guide rolls 304a and 304b, to be slackened as best shown in FIG. 2. It is to be noted that, when the rovings R are forcibly drawn out of the bobbins 102 with the pull bar 311 positioned in the upwardly shifted position as shown in FIG. 3, portions of the rovings between the guide roll 304a and the nipping roll assembly 305a and 305b can be held under tension because the rovings nipped between the rolls 305a and 305b are positively transported towards the guide roll 304b by the rotation of the roll 305b.

The bearing means is generally identified by 314 and comprises a beating head 319 in the form of an elongated bar extending perpendicular to the direction of movement of the rovings and in parallel relation to any one of the guide rolls 304a and 304b and adapted to repeatedly beat the rovings, particularly, portions of the rovings which extend between the nipping roll assembly and the guide roll 304b, in cooperation with the bottom of the bath 302 so that each of the rovings R, which is composed of a plurality of glass fibers twisted together as is well known to those skilled in the art, can be substantially frayed to allow the emulsion 303 to penetrate into interstices of such glass fiber filaments making up said each of the rovings. This beating head 319 is carried by a crank wheel 317 through an articulated rod 318 so that rotation of the crank wheel 317 results in reciprocal repeated movement of the beating head 319. The crank wheel 317 is suitably supported in position and operatively coupled to a drive motor 315 through a transmission member 316, such as substantially endless belt or chain. Preferably, a portion of the beating head 319, which contacts the rovings during the repeated beating, is lined, or otherwise covered, with an elastic member such as made of rubber. Alternatively, the beating head 319 itself may be made of an elastic material such as rubber.

From the foregoing, it is clear that the rovings R, during their simultaneous passage through the emulsion bath 302 while immersed into the emulsion 303 within the bath 302, can be impregnated with the emulsion because of the glass fibers making up each of the rovings can advantageously frayed by the beating means 314 in cooperation with the slackening means. It is also clear that the rovings emerging upwardly from the emulsion bath 302 have respective coatings of thermoplastic resin thereon, which coatings assume their definite shape when subsequently dried.

The immersing unit IU further comprises a squeezer 320 for removing excess emulsion from each of the rovings emerging upwardly from the emulsion bath 302 towards the drying unit DU. The squeezer 320 is positioned above the leading end of the emulsion bath 302 and perpendicular to the direction of advance of the rovings and is constituted by a pair of blade or plate members 321a and 321b so positioned on respective sides of the rovings and so spaced a distance that excess emulsion adhering to the individual rovings emerging from the emulsion bath 302 can be removed as the rovings move past a gap between the blade or plate members 321a and 321b. It is to be noted that the squeezer 320 may be constituted by a single plate member having a slit functionally corresponding to the gap between the above described blade or plate members 321a and 321b.

The immersing unit IU of the above described construction operates as follows.

In the condition as shown in FIG. 2 wherein the nipping roll 305a is held in the releasing position, the pull bar 311 is held in the downwardly shifted position and the beating head 319 is held away from the rovings within the emulsion 303, the rovings R are continuously transferred from the guide roll 304a towards the guide roll 304b within the emulsion bath 302 under the influence of the traction force such as developed by any one of the subsequent processing machine units, particularly, the drawing mechanism DM, at a predetermined velocity. However, when the nipping roll 305a is moved to the nipping position as shown in FIG. 3 while the nipping roll 305b is driven at a peripheral velocity substantially equal to or higher than the velocity of movement of the rovings in the direction towards the guide roll 304b, portions of the respective rovings, which extend between the guide roll 304a and the nipping roll assembly are held under tension with the pull bar 311 positioned in the upwardly shifted position to draw the rovings from the respective bobbins 102 and, simultaneously therewith, the next succeeding portions of the rovings, which extend between the nipping roll assembly and the guide roll 304b, are not held under tension so far as the nipping roll 305b is driven at the peripheral velocity substantially equal to the velocity of movement of the rovings under the influence of the traction force, or become slackened so far as the peripheral velocity of the nipping roll 305b is higher than the velocity of movement of the rovings under the influence of the traction force. It is to be noted that the tension imparted to that portions of the rovings between the guide roll 304a and the nipping roll assembly when the pull bar 311 is shifted to the upwardly shifted position as shown in FIG. 3, can be readily relieved as the rovings are drawn from the respective bobbins 102 under the influence of such tension imparted on that portions of the rovings between the guide roll 304a and the nipping roll assembly.

However, when the nipping roll 305a and the pull bar 311, which have assumed the respective positions as shown in FIG. 3, are returned to the positions as shown in FIG. 2, the entire portions of the rovings which extend between the guide rolls 304a and 304b become slackened as shown in FIG. 2.

The slackening means, included in the immersing unit IU and substantially composed of the nipping roll assembly and the tensioning device 310, is in practice operated repeatedly in the manner described above and, therefore, that portions of the respective rovings which are completely immersed in the emulsion 303 and which extend between the guide rolls 304a and 304b can be substantially always slackened during the transfer of the rovings from one processing station towards the subsequent processing station.

While that portions of the respective rovings extending between the guide rolls 304a and 304b are substantially constantly held slackened as hereinbefore described, the beating means 314 operates to cause the beating head 319 to repeatedly beat the slackened portions of the respective rovings. As the slackened portions of the rovings are repeatedly beaten while the latter are continuously moved towards the subsequent processing station, the glass fibers making up each of the rovings can advantageously be frayed so that the emulsion can readily penetrate into interstices defined among such glass fiber filaments.

The rovings impregnated with the emulsion of thermoplastic resin in the manner described above are then passed through the gap between the blade or plate members 321a and 321b forming the squeezer 320 whereby excessive portion of the emulsion adhering to the individual rovings can be removed. An advantage of the employment of the squeezer 320 will become clear from the subsequent description in connection with the drying unit DU.

The immersing unit IU of the above described construction may be modified as shown in any one of FIGS. 5 to 8, which will now be described.

Modification of FIG. 5

While the beating means of the construction shown in FIG. 2 has been described as having the only beating head 319 and its associated parts, the same beating means shown in FIG. 5 has a plurality of, for example, three, beating heads 319a, 319b and 319c. Specifically, the beating means is shown to comprise separate crank wheels 317a, 317b and 317c to which the beating heads 319a, 319b and 319c are respectively operatively connected through the crank rods 318a, 318b and 318c. These crank wheels 317a, 317b and 317c may be driven by a single motor through a transmission mechanism such as shown in FIG. 2.

Preferably, portions of the bottom of the emulsion bath 302, which are respectively aligned with the beating heads 319a, 319b and 319c, be recessed at 322a, 322b and 322c so that, when the beating heads 319a, 319b and 319c are successively downwardly shifted to beat the rovings, the beating head 319a, 319b and 319c can be engaged into the associated recessed portions 322a, 322b and 322c one at a time together with portions of the rovings as shown.

Figure 6:
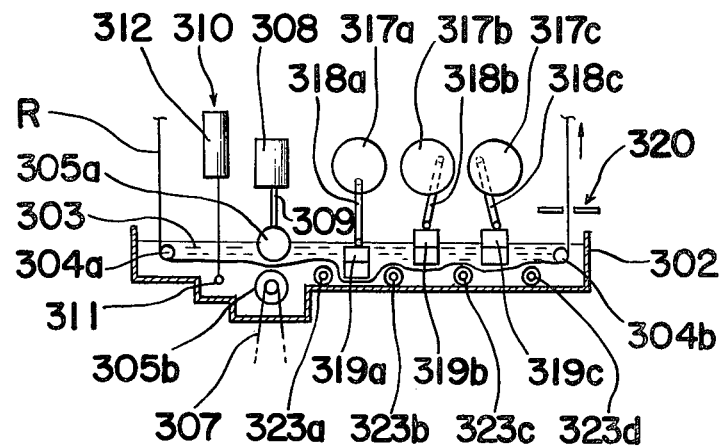
FIG. 6 is a view substantially similar to FIG. 2, showing a further modified form of the immersing unit.

Modification of FIG. 6

The immersing unit IU of the construction shown in FIG. 6 differs from that of the construction shown in FIG. 5 in that such recessed portions 322a, 322b and 322c as having been described as provided on the bottom of the emulsion bath 302 in the modification of FIG. 5 are not provided. Instead of the recessed portions 322a, 322b and 322c employed in the emulsion bath 302 shown in FIG. 5, a plurality of rods 323a, 323b, 323c and 323d are employed and rigidly secured to the bottom of the emulsion bath 302 in spaced and parallel relation to each other. The spacing between each adjacent two of these rods 323a, 323b, 323c and 323d provides a substantial recess for receiving the associated beating head 319a, 319b or 319c, functionally corresponding to the recessed bottom portion 322a, 322b or 322c shown in FIG. 5.

With the immersing unit IU according to any one of the modifications shown in FIGS. 5 and 6, respectively, the slackened portions of the respective rovings can be swayed while beaten by the beating head 319a, 319b and 319c and, therefore, they can readily be frayed as compared with the immersing unit IU of the construction shown in FIG. 2.

Figure 7:
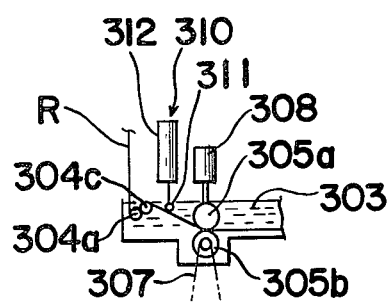
FIG. 7 is a view substantially similar to FIG. 3, showing a modified form of a tension imparting device employed in the immersing unit.

Modification of FIG. 7

In the immersing unit IU of the construction shown in any one of FIGS. 2, 5 and 6, it has been described that the upward shift of the pull bar 311 results in drawing of the rovings R from the associated bobbins 102 and that, when the pull bar 311 is moved to the upwardly shifted position, the nipping roll 305a is moved to the nipping position. However, in the modification shown in FIG. 7, arrangement is made such that, when the pull bar 311 is downwardly shifted, not only the nipping roll 305a can be moved to the nipping position, but also the portions of the rovings between the guide roll 304a and the nipping roll assembly can be temporarily held under tension.

Referring to FIG. 7, a turn-roll 304c is so positioned above and adjacent the guide roll 304a that the rovings turned around the guide roll 304a extend upwardly and then downwardly after having been turned around the turnroll 304c with portions of the rovings between the turn-roll 304c and the nipping roll assembly downwardly inclined towards the gap between the nipping rolls 305a and 305b. The pull bar 311, which has been described as positioned between the rovings and the bottom of the emulsion bath 302 in the immersing unit of the construction shown in any one of FIGS. 2, 5 and 6, is positioned above the rovings so that, when the pull bar 311 is downwardly shifted by the action of the pneumatic cylinder 312 substantially simultaneously with the downward movement of the nipping roll 305a towards the nipping portions of the rovings between the turn-roll 304c and the nipping roll assembly can be downwardly depressed and, therefore, tensioned.

Figure 8:
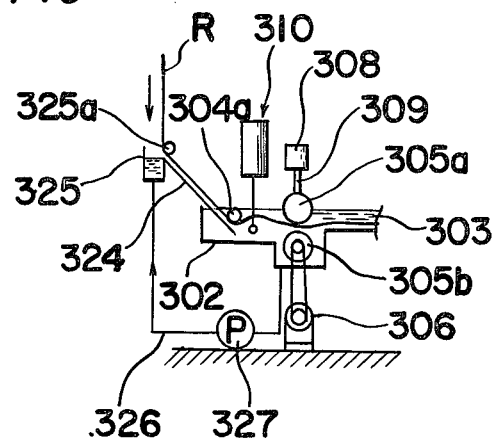
FIG. 8 is a view substantially similar to FIG. 3, showing an emulsion applicator connected to the immersing unit.

Modification of FIG. 8.

The immersing unit IU of the construction shown in any one of FIGS. 2, 5 and 6 may have an emulsion applicator for applying the emulsion, contained in the bath 302, to the rovings prior to the latter being immersed into the emulsion 303 within the emulsion bath 302.

Referring to FIG. 8, the emulsion applicator comprises an elongated reservoir 325 positioned above the leading end of the emulsion bath 302 and rearwardly of the direction of movement of the rovings and extending perpendicular to the direction of movement of the rovings. The reservoir 325 has an overflow edge from which a slope 324 downwardly extends towards and into the emulsion bath 302. The emulsion applicator further comprises an emulsion recycling device includng a pump 327 having a suction port communicated to the emulsion bath 302 through a suitable piping ad a discharge port communicated to the reservoir 325 through a suitable piping 326.

With the construction so far described, it is clear that, during the continued operation of the pump 327 a portion of the emulsion 303 within the bath 302 can be recycled from the bath 302 back to the bath 302 by means of the pump 327 via the reservoir 325 by way of the slope 324. For applying the emulsion to the rovings during its flow on the slope 324 towards the emulsion bath 302, a guide roll 325a is supported in position above and adjacent the overflow edge of the reservoir 325 to urge portions of the rovings, which extend between the turn-roll 103 (FIG. 1) and the guide roll 304a, towards the slope 324. Therefore, portions of the rovings extending between the guide roll 325a and the guide roll 304a are forced to contact the emulsion flowing down through the slope 324.

By so doing, the emulsion can be absorbed by the rovings by the capillary phenomenon and, simultaneously therewith, air contained among interstices of glass fibers making up the individual rovings can be expelled substantially from the individual rovings prior to the latter being immersed into the emulsion 303 within the emulsion bath 302.

The employment of the emulsion applicator of the construction as hereinbefore described is advantageous in that, since the emulsion can be applied to the rovings by the capillary phenomenon prior to such rovings being immersed into the emulsion within the emulsion bath with air in the interstices of the rovings being expelled therefrom, any possible bubbling, which may take place when the rovings are immersed into the emulsion within the emulsion bath 302 due to the presence of air in the interstices of the rovings being treated, can be avoided.

Drying Unit DU

The rovings impregnated with the emulsion, such as indicated by Ra, are then fed to the drying unit DU, the construction of which will subsequently be described, for the purpose of drying the thermoplastic resin coatings on the individual rovings to remove water content and solvent vapor therefrom. The presence of the water content and solvent vapor may, when the thermoplastic resin impregnated in or coated on the rovings are subsequently subjected to the expansion process as will be described later, constitute a cause for formation of undesirable void since they may serve as a sort of unwanted blowing agent.

Before the details of the drying unit DU are described, it is to be noted that, prior to the rovings Ra reaching the collecting unit BU, they are still arranged side-by-side relation to each other laterally of the direction of transfer of the rovings towards the mechanism DM.

Referring now to FIG. 1, the drying unit DU comprises a dryer housing 400 having an inlet slit 401 defined therein and positioned immediately above the leading end of the emulsion bath 302 with the squeezer 320 positioned between the emulsion bath 302 and the inlet slit 401. The dryer housing 400 is preferably of a vertically erected type and includes water-cooled deflector rolls supported in position within the dryer housing 400 for rotation about their own longitudinal axes and positioned substantially one above the other. These water-cooled deflector rolls 403 and 405 are so arranged that the emulsion-impregnated rovings Ra past the squeezer 320 can upwardly extend within the dryer housing 400 and, after having been turned around the deflector roll 403, th-en downwardly extend towards the other deflector roll 405 with portions of the rovings Ra between the deflector roll 403 and the squeezer 320 being substantially parallel to portions of the rovings Ra between the deflector rolls 403 and 405. Positioned on respective sides of and held in contact with the deflector roll 403 are water-cooled presser rolls 404a and 404b cooperative with the deflector roll 403 in such a manner that, not only can portions of the rovings Ra which are turned around the deflector roll 403 be held in contact with the outer peripheral surface of the deflector roll 403, but also the rovings Ra can be turned around the deflector roll 403 in a radius of curvature as small as possible.

It is to be noted that, since the rolls 403, 404a and 404b are of a water-cooled construction, the emulsion-impregnated rovings Ra do not stick to the outer peripheral surface of any of these rolls 403, 404a and 404b.

On the other hand, as is the case with the deflector roll 403, a pair of water-cooled presser rolls 406a and 406b are provided for the deflector roll 405. Since the deflector roll 405 is, in the instance as shown, used to deflect the portions of the rovings Ra, which extend downwards from the deflector roll 403, substantially at right angles thereto and then to allow the rovings Ra to extend substantially horizontally towards the collecting unit BU, the presser rolls 406a and 406b are angularly spaced at right angles from each other with respect to the longitudinal axis of the deflector roll 405. These presser rolls 406a and 406b are cooperative with the deflector roll 405, functioning in a substantially similar manner to the presser rolls 404a and 404b. Moreover, since these rolls 405, 406a and 406b are of a water-cooled consturction, there is no possibility that the emulsion-impregnated rovings Ra stick to any one of these rolls 405, 406a and 406b when they are turned around the roll 405 towards the collecting unit BU.

The drying unit DU further comprises a plurality of pairs of heating panels, the heating panels of each pair being designated by 407a and 407b or 407c and 407d or 407e and 407f. The heating panels 407a and 407b of one pair are positioned on respective sides of the upwardly extending portions of the rovings Ra between the inlet slit 401 and the deflector roll 403 while the heating panels 407c and 407d of another pair are positioned on respective sides of the downwardly extending portions of the rovings Ra between the deflector rolls 403 and 405. The heating panels 407e and 407f of the other pair are positioned one above the other and on respective sides of portions of the rovings Ra which extend between the deflector roll 405 and the collecting unit BU.

Although not shown, any one of the heating panels 407a to 407f is of a construction comprising a plurality of nozzles arranged in a plurality of rows or in a predetermined pattern and adapted to apply hot air therefrom towards the emulsion-impregnated rovings to dry the latter. These heating panels 407a and 407b, 407c and 407d or 407e and 407f of each pair define a first, second or third drying zone between the heating panel of such each pair.

From the foregoing, it is clear that, during the continued transfer of the rovings from the inlet slit 401 towards the collecting unit Bu, the rovings Ra pass through the first drying zone between the heating panels 407a and 407b, then the second drying zone between the heating panels 407c and 407d after having turned around the deflector roll 403 and, finally, the third drying zone between the heating panels 407e and 407f after having turned around the deflector roll 405.

The dryer housing 400 is, as hereinbefore described, preferably of a vertically erected construction because the thermoplastic resin coatings on the rovings Ra during the drying process tend to fall downwards by gravity. More specifically, by causing the rovings to be upwardly transported immediately after they have passed through the squeezer 320, any possible dripping of droplets of thermoplastic resin away from the rovings can advantageously be avoided. In addition, slackening of the portions of the respective rovings Ra being dried, which may result from the weight increased by the thermoplastic resin adhering to the individual rovings, can also be avoided.

The dryer housing 400 has an outlet opening 402 defined therein and positioned a distance away from the leading side of the third drying zone, that is, the heating panels 407e and 407f, in terms of the direction of transportation of the rovings towards the drawing mechanism DM.

Collecting Unit BU

The collecting unit BU for collecting the dried rovings Ra together to provide a bunch Rb of the resin-coated rovings is positioned within the dryer housing 400 innerwardly of the outlet opening 402 and between the heating panels 407e and 407f and the outlet opening 402. The collecting unit BU comprises, as shown in FIGS. 1 and 4, a pair of pressure rolls 601a and 601b supported in position for rotation about their own longitudinal axes which extend inparallel relation to each other. Each of the pressure rolls 601a and 601b is, so far as illustrated, of a construction comprising a substantially cylindrical roll having its outer peripheral surface inwardly recessed to provide an annular groove of substantially semicircular cross-sectional shape so that these pressure rolls 601a and 601b can cooperate with each other to define a substantially circular-sectioned passage therebetween. Preferably, each of the pressure rolls 601a and 601b is of a water-cooled construction.

From the foregoing, it is clear that, as the resin-coated rovings during their continued transfer towards the drawing mechanism DM pass through the substantially circular-sectioned passage between the rolls 601a and 601b, the rovings can be collected together and the rovings so collected together subsequently emerge from the collecting unit BU in the form of the bunch Rb and then emerge outwards from the dryer housing 400 through the exit opening 402 and towards the compressing unit PU.

Compressing Unit PU

The compressing unit PU employed in the apparatus of the present invention is so designed that the bunch Rb of the resin-coated rovings entering the compressing unit PU can emerge therefrom in the form of a continuous strip of substantially rectangular cross-section, such as indicated by Rc, while the resin coatings on the respective rovings forming such bunch Rb are heated to a temperature sufficient to be fluidized, but lower than the temperature at which the blowing agent,contained in the thermoplastic resin coatings, can be decomposed.

Figure 9:
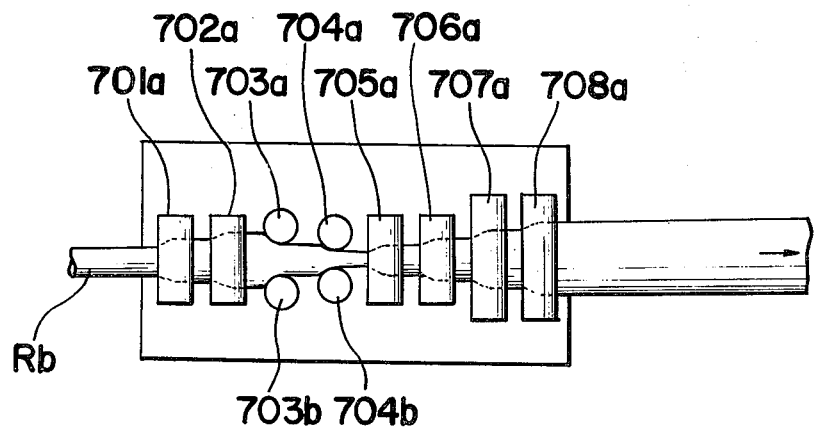
FIG. 9 is a schematic top plan view, on an enlarged scale, of a compressing unit employed in the apparatus shown in FIG. 1.
Figure 10:
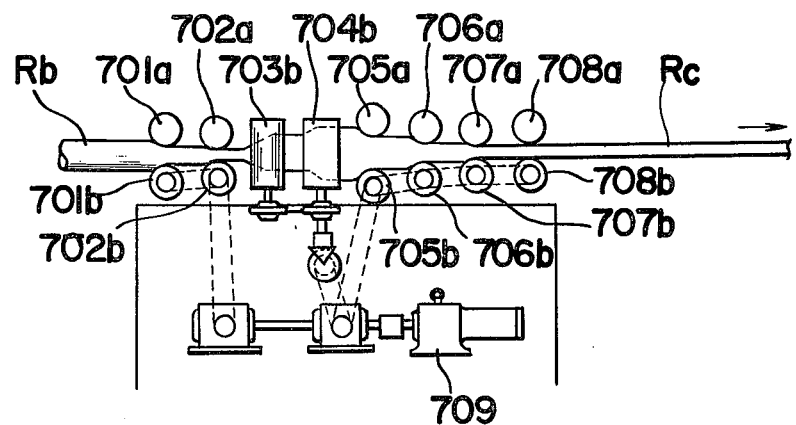
FIG. 10 is a schematic side elevational view of the compressing unit shown in FIG. 9.

Referring now to FIGS. 1, 9 and 10, the compressing unit PU comprises a plurality of pairs of cylindrical pressure rolls 701a and 701b, 702a and 702b, 703a and 703b, 704a and 704b, 705a and 705b, 706a and 706b, 707a and 707b and 708a and 708b of similar construction, all being operatively mounted on a machine bench of such a height that the bunch Rb of the collected rovings can be transported straight into the compressing unit PU, particularly, through a consecutive straight passage defined between the pressure rolls of each pair, without being deflected in any directions. As shown, these pairs of the pressure rolls are so arranged that some of the pairs of the pressure rolls 701a and 701b, 702a and 702b, 705a and 705b, 706a and 706b, 707a and 707b and 708a and 708b have their own longitudinal axes horizontally extending at right angles to the direction of transfer of the rovings while the other pairs of the pressure rolls 703a and 703b and 704a and 704b have their own longitudinal axes extending vertically and at right angles to the longitudinal axes of the pressure rolls of each paor 701a and 701b, 702a and 702b, 705a and 705b, 706a and 706b, 707a and 707b or 708a and 708b.

All pressure rolls of the pairs 701a and 701b, 702a and 702b, 703a and 703b, 704a and 704b, 705a and 705b, 706a and 706b, 707a and 707b and 708a and 708b are of an internally heated construction. Moreover a group of the pressure rolls 701b, and 702b, 703b, 704b, 705b, 706b, 707b and 708b are adapted to be driven by a drive mechanism 709, including a drive motor, by means of any suitable transmission system including substantially endless belts or chains and a reduction gear assembly.

During the passage of the bunch Rb through the consecutive passage defined between the pressure rolls of each pair, interstices among the resin coated rovings can advantageously be destroyed and the thermoplastic resin coatings on the rovings are so fused that they can be integrated together. Therefore, the compressed product emerging from the compressing unit PU is in the form of the continuous strip of riber-reinforced thermoplastic resin material.

The compressing unit PU, which has been described as composed of the pairs of the juxtaposed pressure rolls with reference to FIGS. 1, 9 and 10, may be composed of a plurality of pairs of substantially endless conveyances such as shown in any one of FIGS. 11 and 12, reference to which will now be made.

Figure 11:
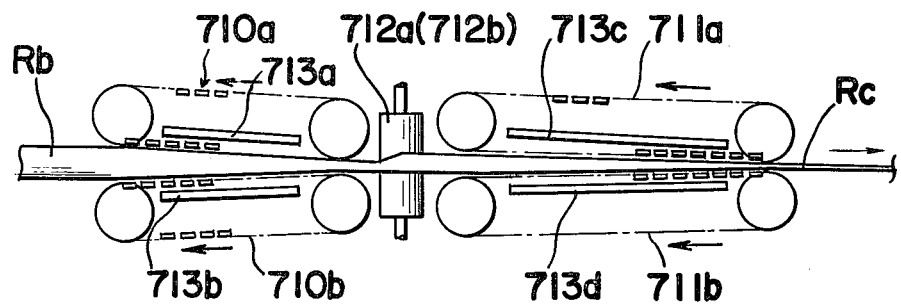
FIGS. 11 to 13 are schematic side views, on an enlarged scale, showing respective modified forms of a compressing unit employed in the apparatus shown in FIG. 1.

Modified Unit of FIG. 11

The compressing unit PU of the construction shown in FIG. 11 comprises two pairs of substantially endless conveyances 710a, 710b and 711a, 711b, each being in the form of a plurality of rectangular metallic plates which are articulately connected to each other to provide a substantially endless configuration similar to a crawler track of a type generally employed in a bulldozer, and a pair of juxtaposed pressure rolls 712a and 712b extending perpendicular to the plane of any one of inner and outer runs of each of the endless conveyances 710a and 710b or 711a and 711b of each pair and positioned between the pairs of the endless conveyances 710a, 710b and 711a, 711b. Within a space defined between the inner and outer runs of any one of the endless conveyances 710a and 710b or 711a and 711b of each pair, there is provided a heating device 713a, 713b, 713c or 713d positioned adjacent the inner run of the associated endless conveyance 710a, 710b, 711a or 711b for heating the bunch Rb of the resin coated rovings being compressed as it pass through a gap between the endless conveyances of any pair. Preferably, the endless conveyances 710a and 710b or 711a and 711b of any pair are so positioned relative to each other on respective sides of the bunch Rb being compressed that the spacing between the inner runs of the respective endless conveyances, which contact the bunch Rb being compressed, gradually decreases towards the subsequent processing unit, that is, the heating unit HU. Although not shown, it is to be understood that the endless conveyances of these pairs are adapted to be driven by any known or suitable drive mechanism in respective directions as indicated by the arrows.

Figure 12:
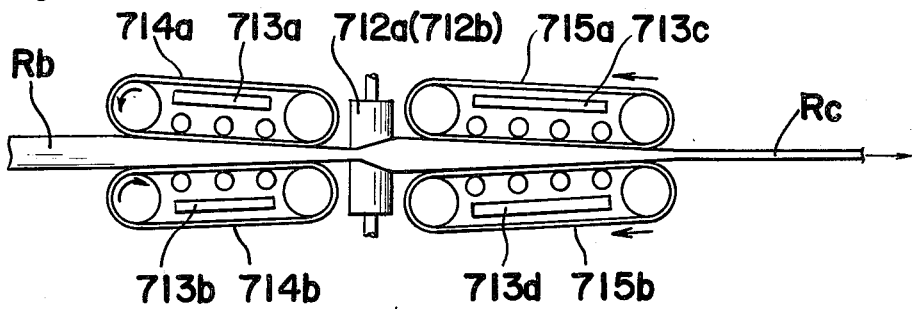

Modified Unit of FIG. 12

The compressing unit PU of the construction shown in FIG. 12 is similar to that shown in FIG. 11, except for the endless conveyances being in the form of endless belts 714a, 714b, 715a and 715b. Since the endless belts 714a, 714b, 715a and 715b employed in the compressing unit PU of the construction shown in FIG. 12 are flexible, a plurality of back-up rolls are necessitated to force the respective inner ru-ns of the endless belts to contact the bunch Rb being compressed.

Figure 13:
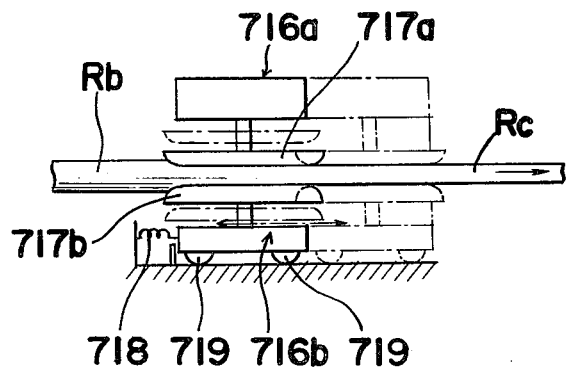

In addition to the caterpillar type, such as shown in FIG. 11, and the flexible belt type such as shown in FIG. 12, the compressing unit PU may have an alternative construction of press type such as shown in FIG. 13, reference to which will now be made.

Modified Unit of FIG. 13

Referring to FIG. 13, the compressing unit PU comprises upper and lower carriers 716a and 716b positioned one above the other with the bunch Rb extending therebetween and connected with each other. The lower carrier 716b has pairs of wheels 719 rotatably mounted thereon so that the carriers 716a and 716b can be moved between a press position as indicated by the solid line and a release positin as indicated by the chain line. However, by the action of a tension spring 718, the carriers 716a and 716b are normally biased to the press position.

The carriers 716a and 716b carry respective ram plates 717a and 717b of internally heated construction, each of said ram plates 717a and 717b being operatively supported by the corresponding carrier 716a or 716b for movement between an engaged position, as indicated by the solid line, and a disengaged position as indicated by the chain line.

The compressing unit of the construction shown in FIG. 13 is so designed that, when the carriers 716a and 716b are held in the press position as shown by the solid line, the ram plates 717a and 717b are simultaneously moved towards the engaged position to hold the roving bunch Rb under pressure therebetween and, when the carriers 716a and 716b are moved to the release position as shown by the chain line, the ram plates 717a and 717b, which have assumed the engaged position, are moved back towards the disengaged position as shown in the chain line. The movement of the carriers 716a and 716b on the machine bench or floor by means of the wheels 719 from the press position towards the release position against the spring 718 is effected by the traction force transmitted thereto from the roving bunch Rb, being drawn towards the drawing mechanism DM, by way of the ram plates 717a and 717b which are then held in the engaged position. Return of the carriers 716a and 716b back towards the press position is effected by the spring 718 when the ram plates 717a and 717b are returned to the disengaged position with the carriers 716a and 716b held in the release position.

From the foregoing, it will readily be seen that, each time the roving bunch Rb is moved a distance corresponding the distance of travel of the carriers 716a and 716b from the press position to the release position, the roving bunch Rb can be compressed to provide the continuous strip Rc of fiber-reinforced thermoplastic resin material.

Although not shown, the compressing unit of the construction shown in FIG. 13 is to be understood as further comprising a pair of internally heated side ram plates adapted to apply a pressure to the roving bunch Rb in a direction perpendicular to the direction of movement of any one of the ram plates 717a and 717b.

Heating Unit HU

The continuous strip Rc of fiber-reinforced thermoplastic resin material emerging from the compressing unit PU of the construction shown in any one of FIGS. 1 and 9, FIG. 14, FIG. 12 and FIG. 13 is subsequently transported to the heating unit HU including a heating tunnel being hsaped so as to accommodate the desired cross-section of the final product, where the resin strip Rc is heated to a temperature higher than the temperature, at which the blowing agent employed in the emulsion 303 (FIG. 1) can be decomposed, to allow the fiber-reinforced thermoplastic resin material to expand to ultimately provide the fiber-reinforced thermoplastic resin of cellular structure such as indicated by Rd.

Referring now to FIG. 1, the heating unit HU includes a heating tunnel comprising lower and upper molds 802 and 803 and a pair of spaced side molds (not shown) all being of a substantially sleigh-like shaped and assembled together to provide a rectangular-sectioned passage through which the resin strip Rc is transported. The heating tunnel is rigidly mounted on a machine bench 801 with the passage in the heating tunnel aligned with the passage in the compressing unit PU. The upper, lower and side molds of the tunnel are provided with respective heating panels 804 for heating the associated molds which in turn heat the resin strip Rc, being passed through the passage in the tunnel, to a temperature higher than the temperature at which the blowing agent employed in the emulsion 303 can be decomposed. Therefore, it will readily be seen that, during the continued passage of the resin strip Rc through the passage in the heating tunnel, the resin strip Rc consisting of the thermoplastic resin and the glass fiber rovings can be expanded, the expansion substantially completing shortly before it emerges out of the heating tunnel.

Cooling Unit CU

A continuous rectangular bar of fiber-reinforced, expanded thermoplastic resin emerging from the heating unit HU is then transported to the cooling unit CU including a cooling tunnel which has the same cross-section as the heating tunnel positioned next to the heating unit HU for cooling the continuous bar of fiber-reinforced, expanded thermoplastic resin to finally provide the cellular FRTP product according to the present invention.

Referring still to FIG. 1, the cooling unit CU includes a cooling tunnel comprising upper and lower molds 902 and 903 and a pair of spaced side molds (not shown) all being of a substantially elongated plate-like shape and assembled together to provide a rectangular-sectioned passage through which the resin bar Rd is transported. The cooling tunnel is rigidly mounted on a machine bench, which may be a part of the machine bench 801, with the passage in the cooling tunnel aligned with the passage in the heating tunnel.

The upper, lower and side molds of the cooling tunnel forming the cooling unit CU are provided with respective cooling jackets 901 in the form of a fluid piping through which a coolant, for example, a water, flows to cool the molds and then the continuous resin bar Rd being passed through the passage in the cooling tunnel.

Alternatively, the upper, lower and side molds of the cooling tunnel may be integral parts of the respective sleigh-like upper, lower and side molds of the heating tunnel of the heating unit HU.

Drawing Mechanism DM

The drawing mechanism DM drawing the resultant product, that is, the cellular FRTP product in the form of a continuous bar, from the cooling unit CU comprises a pair of juxtaposed drawing rolls 1102a and 1102b positioned one above the other by any suitable support framework and spaced a distance corresponding to the thickness of the resultant FRTP product. One or both of these drawing rolls 1102a and 1102b are operatively coupled to a drive motor (not shown) by means of any suitable transmission system (not shown) composed, for example, a substantially endless belt or chain or a train of gears.

Instead of the employment of the rolls 1102a and 1102b, a pair of substantially endless conveyances of caterpillar type may be employed, in which case a relatively greater drawing force can be available than that afforded by the rolls 1102a and 1102b.

While the apparatus for continuously manufacturing the cellular FRTP product is constructed as hereinbefore fully described, the present invention will be described by way of examples for the sole purpose of illustration.

EXAMPLE I 41 glass fiber rovings, each manufactured and sold by Asahi Fiber Glass Co., Ltd. of Japan under a trade name "GLASSRON R-4450", were continuously immersed in the emulsion bath containing a thermoplastic resin emulsion consisting of 200 parts of a commercially available emulsion of styreneacrylonitrile-methyl methacrylate copolymer (50% solid particles), which is manufactured and sold by Showa High Polymer Co., Ltd. of Japan under a trade name "POLYSOL OLX-6043", mixed with a water dispersion containing 7 parts of water, 3 parts of a commercially available blowing agent, which is manufactured and sold by Sankyo Kasei Co., Ltd., of Japan under a trade name "CELLMIC C-200" and which can be decomposed at 200° C., and 0.12 part of a commercially available dispersing agent manufactured and sold by Kao-ATLAS Co., Ltd. of Japan under a trade name "DEMOL NL".

During the immersion of the glass fiber rovings into the emulsion within the bath, the rovings were beaten while slackened. The amount of the emulsion impregnated in the rovings after the latter had been passed through the squeezer was 467% by weight relative to the rovings. The temperature of the hot air applied to the emulsion-impregnated rovings within thd dryer housing was 160° C. and the temperature of each of the deflector rolls 403 and 405 and the pressure rolls 601a and 601b of the collecting unit BU was 100 to 130° C. as a surface temperature. The pressure rolls 601a and 601b of the collecting unit BU were designed to give the bunch of resin-coated glass fiber rovings of substantially circular cross-section of a diameter of about 40 mm. The bunch of resin-coated glass fiber rovings was then transported to the compressing unit PU where the gradually increasing pressure was successively applied thereto by means of the pairs of the rolls, heated to have a surface temperature of 160° C., to give the resin strip having a width of 55 mm. and a thickness of 8 mm. The resin strip emerging from the compressing unit PU was subsequently transported to the heating unit HU and then to the cooling unit CU, the passage in each of said heating and cooling units HU and CU having a cross-sectional area of 20 mm. in height and 60 mm. in width. The molds forming the tunnel of the heating unit HU were heated to have a surface temperature of 220° C. and the molds forming the tunnel of the cooling unit CU were of a water cooled construction.

The cellular FRTP product was drawn by the drawing mechanism DM at a rate of 0.5 m. per minute.

The cellular FRTP product so manufactured has glass fibers in an amount of 30%, a specific gravity of 0.50, a flexural strength of 684 kg/cm$^2$ and a modulus in flexure if 48,000 kg/cm$^2$.

EXAMPLE II 68 glass fiber rovings of the same type as employed in Example I were immersed in the emulsion bath containing the thermoplastic resin emulsion of the same composition as in Example I, but added with a small amount of a commercially available viscosity increasing agent of emulsion type, which is manufactured and sold by Nippon Acryl Co., Ltd. of Japan under a trade name "Primal ASE 60", in order to adjust the viscosity of the emulsion to about 2,000 c.p.s. at 20° C.

The immersing unit IU was of a construction substantially as shown in FIG. 2 wherein the beating head 319 was lined with a rubber layer of a JIS hardness of 60°, the width of said beating head, as measured in a direction parallel to the direction of movement of the rovings, was 40 mm. The bearing head 319 was applied to the rovings within the emulsion bath at a rate of 80 beats per minute. The velocity of movement of the rovings, measured at the trailing and leading ends of the emulsion bath was 0.5 m. per minute.

The squeezer 320 was of a type constituted by an elongated plate having a plurality of perforations equal in number to the number of the rovings employed, and was so designed as to render the thermoplastic resin emulsion adhering to the rovings in an amount of 467% by weight which resulted in the following ratio after the rovings impregnated with the emulsion had been dried.

Amount of Glass Fiber Rovings/Resin=30/70

The ambient temperature within the dryer housing 400 was 160° C.

The compressing unit PU was of a roll type such as shown in FIGS. 9 and 10 and capable of giving the strip of 10 mm. in thickness and 90 mm. in width.

The heating unit HU was of a type wherein the molds, each 6 m. in length, were assembled to provide a tunnel or heating passage of 20 mm. in height and 100 mm. in width, the mold assembly forming the tunnel being heated to 200° C. and wherein there was provided a brush-type applicator at intervals of one meter for applying heat-resistant silicone oil to the surface of the resin strip being heated and, therefore, expanded.

The cooling unit CU was of a type similar in construction to the heating unit except that the length of the cooling tunnel of the cooling unit CU was 1 m. and wherein the molds forming the tunnel were of a water cooled construction.

The drawing mechanism DM was of a caterpillar type capable of exerting a maximum drawing force of 2 tons, the drawing force actually necessitated to draw the expanded resin bar out of the cooling unit CU being 500 to 600 kg.

The resultant cellular FRTP product, 20 mm. in thickness and 100 mm. in width, was found to have a smooth surface and a cellular structure wherein fine cells were uniformly distributed. The cellular TRTP product so manufactured has a specific gravity of 0.50, a flexural strength of 650 kg/cm$^2$ and a modulus in flexure of 44,000 kg/cm$^2$.

EXAMPLE III

By the use of the apparatus employed in Example I with the compressing unit PU omitted, the cellular FRTP product was manufactured under the same conditions as set forth in Example I. The resultant cellular FRTP product was found to have glass fibers in an amount of 29.4%, a specific gravity of 0.51, a flexural strength of 560 kg/cm$^2$ and a modulus in flexure of 40,000 kg/cm$^2$.

Although the present invention has fully been described by way of examples, it is to be noted that various changes and modifications are apparent to those skilled in the art. By way of example, although the slackening means in the foregoing embodiment has been described as composed of the nipping roll assembly and the tensioning device 310, the tensioning device 310 may be omitted of the nipping roll assembly is so designed that, when the nipping roll 305a is moved to the nipping position, the rovings within the emulsion bath 302 can assuredly and firmly be held in position between the nipping rolls 305a and 305b.

Figure 14:
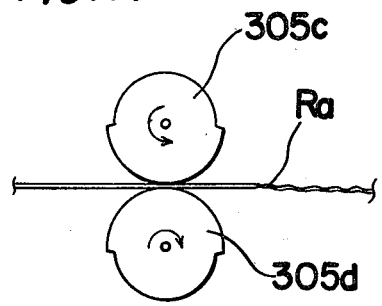
FIG. 14 is a schematic side elevational view, showing a modified form of a bundle slackening means employed in the immersing unit of the apparatus.

Furthermore, if the nipping roll assembly is constituted by a pair of such rolls as shown by 305c and 305d in FIG. 14, the cylinder 308 and its associated parts including the cylinder rod 309 are no longer necessary. More specifically, the rolls 305c and 305d shown in FIG. 14 are so designed that, during half the complete rotation of these rolls 305c and 305d in synchronism with each other, the rolls 305c and 305d firmly hold the rovings in position therebetween and, during the rest of the complete rotation thereof, they form a clearance therebetween to allow the rovings to pass therethrough freely. For this purpose, each of the rolls 305c and 305d is of a construction having a substantially segmental-shaped projection circumferentially extending a predetermined angle about the longitudinal axis of the roll 305c or 305d. It is, however, to be noted that the angle of circumferential extension of the segmental-shaped projection on each of the rolls 305c and 305d may be determined in consideration of the velocity of movement of the rovings under the influence of the traction force and, particularly, that developed by drawing mechanism DM.

Therefore, such changes and modifications are, unless they depart from the true scope of the present invention, to be understood as included within such true scope of the present invention.

What is claimed is:

1. A method for manufacturing a fiber-reinforced thermoplastic resin of cellular structure, which comprises the steps of:

continuously supplying a plurality of bundles of filaments of fibrous reinforcing material in side-by-side relation to each other;

impregnating the bundles of filaments of fibrous reinforcing material with an emulsion of thermoplastic resin added with a flowing agent in a bath, where said bundles are transported therethrough while said bundles are slackened and concurrently repeatedly beaten in the condition of free tension to cause said bundles to be substantially frayed to facilitate penetraton of the emulsion composition into the filaments;

squeezing out the excess emulsion to control the amount of the emulsion adhering to the reinforcing filament bundles;

drying the emulsion-impregnated reinforcing filament bundles to obtain the fiber-reinforced thermoplastic resin material;

collecting the dried reinforcing filament bundles together to provide a single bunch of the fiber-reinforced thermoplastic resin material, said bunch being shaped not larger than a cross-section of a proceeding tunnel for expanding;

heating the bunch of the fiber-reinforced thermoplastic resin material to be allowed to expand in the heating tunnel at a temperature higher than that of decomposition of the blowing agent, which has a desired cross-section of a final product to control the expansion of the bunch of the fiber-reinforced thermoplastic resin material;

cooling the expanded fiber-reinforced thermoplastic resin material in a cooling tunnel, which has the same cross-section as the heating tunnel, to provide the fiber-reinforced thermoplastic resin of cellular structure; and drawing the cooled fiber-reinforced thermoplastic resin of cellular structure.

2. A method as claimed in claim 1, further comprising a step of compressing the bunch of the fiber-reinforced thermoplastic resin material by the application of pressure thereto from all directions, while said bunch of the fiber-reinforced thermoplastic resin material is heated, to cause the respective bundles to be integrated togeter with voids removed therefrom.

3. An apparatus for manufacturing a fiber-reinforced thermoplastic resin of cellular structure, which comprises, in combination:

a supply unit from which a plurality of bundles of filaments of fibrous reinforcing material are simultaneously and continuously supplied in side-by-side relation to each other;

an immersing unit for impregnating the reinforcing filament bundles with an emulsion of thermoplastic resin added with a blowing agent, said immersing unit comprising a bath containing the emulsion composition, means for slackening the reinforcing filament bundles, means for repeatedly beating the slackened portions of the reinforcing filament bundles to cause the latter to be substantially frayed to facilitate impregnation of the emulsion into the filaments of the bundles, and means for squeezing out the excess emulsion to control the amount of the emulsion adhering to the reinforcing filament bundles;

a drying unit including a drying housing for drying the emulsion impregnated reinforcing filament bundles to obtain the fiber reinforced thermoplastic resin material;

a collecting unit for collecting the dried impregnated filament bundles together to provide a single bunch of the fiber-reinforced thermoplastic resin material, and amking the said bunch to shape the size of a dimension not larger than a cross-section of a proceeding tunnel for expanding;

a heating unit including a heating tunnel heated at a temperature higher than that of decomposition of the blowing agent, which has a desired cross-section of a final product to control the expansion of the bunch of the fiber-reinforced thermoplastic resin material, therein said material is heated to be allowed to expand;

a cooling unit including a cooling tunnel for cooling the expanded fiber-reinforced thermoplastic resin material, which has about the same cross-section as the heating tunnel, to provide the fiber-reinforced thermoplastic resin or cellular structure; and a drawing mechanism for drawing the cooled fiber-reinforced thermoplastic resin of cellular structure.

4. An apparatus as claimed in claim 3 wherein said slackening means comprises a tensioning means and first and second nipping rolls, the first nipping roll being supported in positon for reciprocal movement between nipping and release positions in a direction, respectively, close to and away from the second nipping roll, said first and second nipping rolls, when said first nipping roll is removed to the nipping position, holding the reinforcing filaments of the bundles therebetween said tensioning means operating to impart a tenson temporarily to the reinforcing filament bundles thereby to draw the reinforcing filament bundles from the supply unit to cause said bundles to be slackened.

5. An apparatus as claimed in claim 3, further comprising a compressing unit for compressing the bunch of the fiber-reinforced thermoplastic resin material by the application of pressure thereto from all directions, while said bunch of the fiber-reinforced thermoplastic resin material is heated, to cause the respective bundles to be integrated together with voids removed therefrom.

6. An apparatus as claimed in claim 5, wherein said slackening means comprises a tensioning means and first and second nipping rolls, the first nipping roll being supported in position for reciprocal movement between nipping and release positions in a direction, respectively, close to and away from the second nipping roll, said first and second nipping rolls, when said first nipping roll is moved to the nipping position, holding the reinforcing filament bundles therebetween, said tensioning means being operable to impart a tension temporarily to the reinforcing filament bundles when the first nipping roll is in the nipping position, thereby to draw the reinforcing filament bundles from the supply unit to cause said bundles to be slackened.

* * * * *